S. Van Patten,

Chair Tip.

No. 102,627. Patented May 3, 1870.

Witnesses:
Edgar Tate
Geo. W. Mabee

Inventor:
S. Van Patten
PER Munn & Co
Attorneys.

United States Patent Office.

SILAS VAN PATTEN, OF ALBANY, NEW YORK.

Letters Patent No. 102,627, dated May 3, 1870.

IMPROVED ELASTIC TIP FOR LEGS OF CHAIRS, &c.

The Schedule referred to in these Letters Patent and making part of the same.

*To all whom it may concern:*

Be it known that I, SILAS VAN PATTEN, of Albany, county of Albany and State of New York, have invented a new and Improved Elastic Tip for Chairs; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
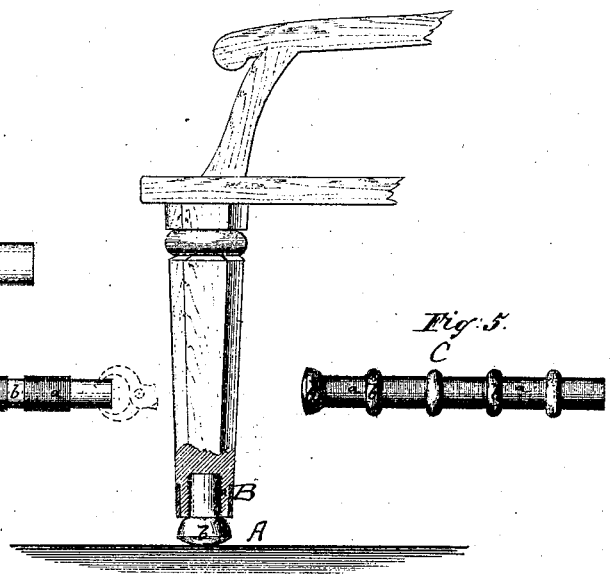
Figure 1 represents a side view of my improved tip, showing it secured in the leg of a chair.
Figure 3:
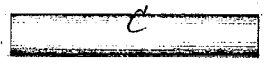
Figure 3 is a side view of the rubber from which the plug is made.

This invention relates to a new elastic attachment to the ends of chair-legs, which has for its object to deaden the noise of removing the chair, and to protect the floor or carpet upon which the same may be placed.

The invention consists in the use of a rubber plug, of peculiar construction, inserted in a socket which is formed in a chair-leg, the plug having a head that fits against the end of such leg, all as hereinafter more fully described.

The invention also consists of a novel manner of constructing the said plugs from cylindrical pieces of vulcanized India rubber.

A in the drawing represents the improved tip or plug made of rubber of suitable size.

I make it from a cylindrical piece, C, of rubber, in the following manner:

The rubber is stretched by having tension applied to its ends, until its diameter is reduced to the size of the mortise in the chair-leg.

Figure 4:
Figures 4 and 5 are side views of the rubber-bars prepared.

While the rubber is thus stretched, cords or strings, $a\ a$, are wound tightly around it in sections of suitable length, there being portions $b$ of the rubber left between the cords, which are not thus surrounded, as shown in fig. 4. When the entire length of rubber has been thus properly tied, the tension is allowed to cease.

Figure 5:
Figure 2:
Figure 2 is a plan or top view of the same.

The non-covered portions $b\ b$ will then, as they contract, resume the original size of the cylinder C, while the tied portions, being unable to expand, will remain compressed, as shown in fig. 5.

Figure 6:
Figure 6 is a side view of the plug.

The rubber thus prepared is now cut into small pieces A A, each piece consisting of one covered part and a non-covered portion, $b$, as shown in fig. 6. The covered part constitutes the shank, the other the head of the plug. The shank is inserted in the mortise of the chair-leg, the head abutting against the end of the leg, as shown in fig. 1. When the plug has been applied, a fine knife is forced into the mortise to cut the string $a$, whereby the shank will be liberated to expand, and to thereby be firmly retained in the leg.

The head of the plug forms an elastic support for the chair, and protects the leg as well as the surface upon which the same is placed.

Having thus described my invention,

I claim as new and desire to secure by Letters Patent—

1. Securing an elastic plug in the leg of a chair by winding a cord around the shank-portion of said plug, and after inserting it cutting the cord to allow its expansion, substantially as described.

2. The herein-described method of preparing rubber plugs for chairs, &c., by stretching cylindrical pieces of rubber, and tying cord around alternate sections of the same, as set forth.

SILAS VAN PATTEN.

Witnesses:
A. V. BRIESEN,
GEO. W. MABEE.